June 10, 1941.  T. T. NUDSON ET AL  2,245,221
DEVICE FOR MEASURING DRILL PIPE
Filed July 1, 1940  2 Sheets-Sheet 2
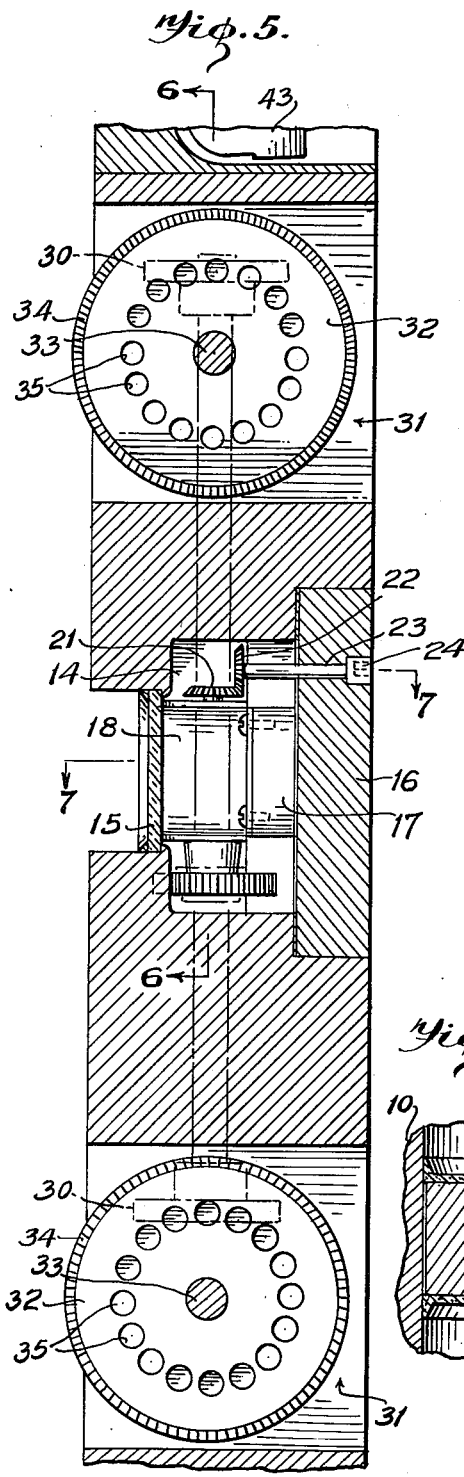
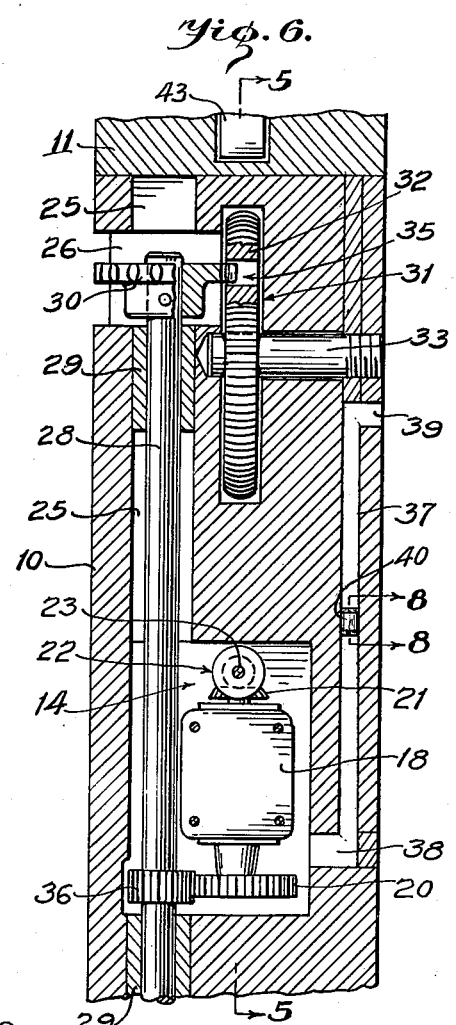
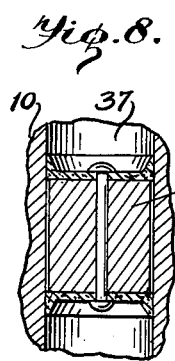
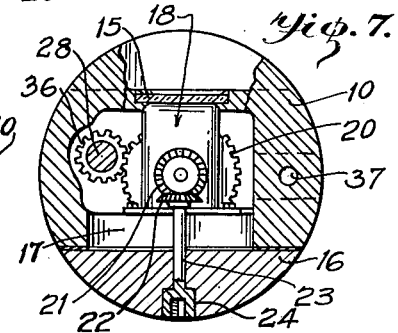
INVENTORS
Thomas T. Nudson,
Walter A. Abegg
BY Myron G. Clear
ATTORNEY

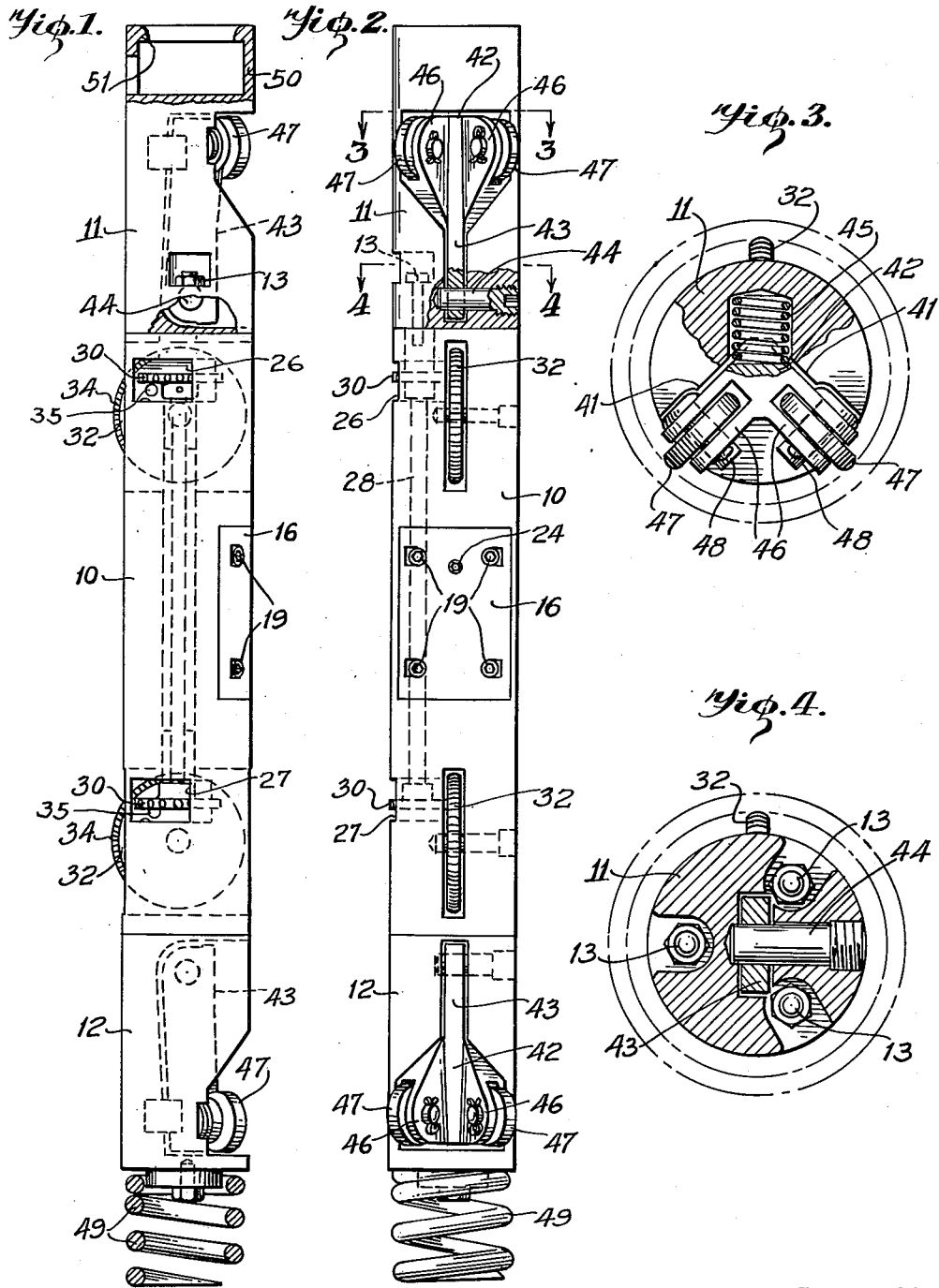

UNITED STATES PATENT OFFICE 2,245,221

DEVICE FOR MEASURING DRILL PIPE

Thomas T. Nudson, Long Beach, and Walter A. Abegg, Vernon, Calif., assignors to Abegg & Reinhold Co. Ltd., Vernon, Calif., a corporation of California Application July 1, 1940, Serial No. 343,344

9 Claims. (Cl. 33—141)

The present invention relates generally to devices and apparatus for measuring well pipe, more particularly the measurement of the length of drill pipe as used in the rotary drilling of oil wells, and has for its primary object the provision of means for conveniently and accurately measuring the length of drill pipe in a quick, easy and effective manner, while the pipe is under tension in a well.

It is commonly known that stock lengths of drill pipe, when under tension as in the rotary drilling of an oil well, especially a deep well of the present day, undergo, or are subject to, varying stretch due at least in part to variations in metal, heat and strain in the rotary drilling. Possibly many other factors enter into this problem, but in any event the result is that simple multiplication of the individual lengths of the drill pipe sections by the number of such sections in the drill string does not truly represent the length of the string or the depth of the bored hole.

Furthermore, the measurement of the individual lengths of the pipe sections at the surface, following the drilling operation, is a slow tedious means for the accurate measurement of the depth of the hole, and can only be accomplished in the course of successive removal of the stands of drill pipe, in coming out of the hole. It is an important object of the present invention to provide a measuring device which may be quickly and effectively used to accurately measure the length of the drill string in the well at any time without regard to whether or not the string is to be withdrawn, and without requiring its withdrawal or in any manner affecting prompt resumption of drilling operations if such is desirable.

It is another object, in the interest of accuracy, and as an efficient guide and check in the logging of the well, to provide a measuring device for drill pipe which is capable of use without loss of time in a manner to accurately measure the length of the drill pipe while under stretch or tension in the hole, to thus permit quick accurate determination of the depth of the hole from the surface to the drilling bit.

It is a further object to provide an accurate measuring device which may be readily reset, and which merely requires in any use thereof, the anchoring or support of the drill pipe and removal of the kelly, in order that it may be introduced into connection with the pipe for the efficient accomplishment of its intended purposes.

Still another object of the invention is the provision of a measuring device partaking of the nature of a go-devil, which will give accurate results when either released to freely descend of its own volition in the drill pipe through the drilling mud or fluid, until finally arrested by the drilling bit, or lowered on a line such for instance as a sand line where, for example, its withdrawal is desirable prior to the withdrawal of the drill pipe.

Still another object of the invention may be said to be the adaptability thereof to passage through drilling mud or fluid without affecting its accuracy, as well as to accurately registering measurement in movement both upwardly and downwardly with respect to the pipe being measured, without danger of inaccuracy due to the joints or unequal spaces between the ends of coupled sections of the pipe sections.

A further object is the provision of a measuring device of the type above set forth having provision for the isolation of registering means therein from the fluid within a well and also having provision for equalizing pressure therein with changing well pressures in the course of movement of the device to various well depths.

Many other objects, as well as the resulting advantages of the invention, may be well understood, and thoroughly appreciated, from the following description, in detail, of a construction constituting the best mode so far devised for carrying the invention into practical effect. In this description reference will be made to the accompanying drawings, which form a part of this specification, and in which, Figure 1 is a side elevation, partly broken away and in section, of the complete tool or device.

Figure 2 is a similar view, the device being turned ninety degrees with respect to Figure 1.

Figure 3 is an enlarged detail cross section taken substantially on line 3—3 of Figure 2.

Figure 4 is a similar view taken substantially on line 4—4 of Figure 2.

Figure 5 is a vertical longitudinal section through a portion of the device taken substantially on line 5—5 of Figure 6.

Figure 6 is a similar view taken substantially on line 6—6 of Figure 5.

Figure 7 is a detail cross section taken substantially on line 7—7 of Figure 5, and Figure 8 is a detail longitudinal section taken on line 8—8 of Figure 6.

Referring now to the several above described figures of the drawings, and particularly to Figures 1 and 2, we have shown the device as including an elongated cylindrical body 10 which, except for certain features to be hereinafter mentioned, may be solid.

The body 10 is preferably provided with square cut ends for the reception of axially alined upper and lower end pieces or members 11 and 12. These end members, which in certain respects duplicate one another, may be secured to the opposite ends of the body 10 in any suitable manner. For reasons which will presently appear, it is preferable that the upper end member be detachably connected to the body as by means of longitudinally extending, circumferentially spaced coupling bolts 13 as seen in Figures 1 and 4.

At a point intermediate its ends, and as best seen in Figures 5 and 6, the body 10 is chambered as at 14, this chamber, hereinafter termed the registering chamber, being closed at one side of the body by an inset window 15 and at the opposite side thereof by a contoured closure plate 16. The inner flat surface of this plate 16 has a block 17 to which is securely anchored a register 18 in a manner which will present the dial or face of the register against the inner surface of window 15 when closure plate 16 is securely fastened in its properly seated position. For securing this plate in such position bolts 19 are provided therethrough to thread into openings in the body 10 beyond opposite ends of chamber 14.

The register 18 may be of any well known make to be purchased on the open market, having an operating shaft which may be actuated by a gear wheel 20 at one end and may, at its other end have a bevel gear 21 for engagement by a similar gear 22, as best seen in Figures 5 and 6, on the inner end of a resetting shaft 23. This shaft 23 is rotatably mounted through the closure plate 16 and has an outer head 24 rotatable in a counterbore of the plate with a socket for engagement by a conformable wrench or tool whereby the register may be reset from the exterior of the device without necessitating removal of the plate 16.

Extending from its upper end, the body 10 has a longitudinal bore 25 which is on a line parallel with the axis of the body, passing through a portion of chamber 14 and through similar side cavities 26 and 27 in the body adjacent to its opposite ends. In this bore, insertable through the upper end thereof at the upper end of body 10, is a shaft 28, which is rotatable in bearings 29 effectively closing the bore 25 above and below the chamber 14. To the ends of shaft 28, within the cavities 26 and 27, are secured gear members 30 shown in the form of peripheral pin gears, which are disposed at right angles to the longitudinal axis of the body 10.

Diametrically through the body 10, adjacent to its opposite ends, are longitudinally slotted openings 31 in which traction gears 32 are journalled on transverse bearing pins 33 in such a manner that their milled or otherwise roughened peripheries 34 project beyond one and the same side of the body 10 to engage the inner surface of a pipe into which the device is lowered for measuring purposes. These traction gears 32 have circumferential series of openings 35 in which the peripheral pins of gears 29 mesh so that rotation of traction gears 32 by reason of their engagement with a pipe, while the device is in movement therethrough, will thus be transmitted to shaft 28 and, through the latter, to the register 18 by way of a gear 36 on said shaft in mesh with the register gear 20, as plainly seen in Figure 6.

By reason of the bearings 29 around shaft 28 above and below the chamber 14, and the secure connection of the plate 16 in countersunk relation within the surface of body 10, it is obvious chamber 14 is effectively and completely isolated from the exterior, and that when the dial surface of register 18 is seated against the window 15, its actuating gear 20 is engaged with the shaft gear 36 as plainly seen in Figure 7. The said chamber may thus be filled with a lubricating oil so that the operating parts therein may be completely immersed and protected from the drilling fluid in the drill pipe downwardly through which the device moves in use Since it is important that the pressure in chamber 14 be maintained at all times the same as pressure existing outside the device, or in other words that internal and external pressures be maintained constant, it is important to vary the internal pressure as the external pressure varies in use. We provide for this, preferably by forming the body 10 with a longitudinal channel 37 best seen in Figure 6, one end of which communicates by a lateral passage 38 with the chamber 14 and the other end of which has a lateral opening 39 through the surface of the body.

Within the above mentioned channel 37 is a free moving, snugly fitting equalizing piston 40, seen also in the detail Figure 8, which is thus exposed at one end to external pressure and at its other end to internal pressure, and is shiftable to permit variation of pressure in chamber 14 in accordance with existing external pressure.

It will be observed that the two traction gears 32 are at points spaced substantially lengthwise of the body 10 and that they therefore engage the inner surface of a pipe at substantially longitudinally spaced points along the latter so that in passing joints in the drill pipe being measured, one or the other of said traction gears or wheels will necessarily engage an unbroken internal pipe surface.

Since both traction gears or wheels are connected with the register, actuation of the latter will be controlled by either of said gears or wheels in tractive engagement with the unbroken pipe surface and no inaccuracy can result from the slipping of one of the traction wheels or gears into the internal space of a pipe joint.

In order to insure uniform engagement of the traction wheels or gears 32 with the pipe surface in use under elastic tension to bring about accurate actuation of the registering mechanism, the end members 11 and 12 are each provided with a laterally opening cavity 41 therein for the reception of an angular bracket 42 having a stem 43 pivoted in a slot of the end member on a transverse bearing pin 44 so that the bracket 42 has a limited swinging movement in a plane at right angles to the longitudinal axis of the body 10 to more or less project from its cavity 41 under tension of a spring 45, and in a direction diametrically opposite to the projecting portions of the traction wheels 32. The spring 45 of each end member of the body is mounted in opposing spring bores in the member and its bracket 42, and the angular portions of each bracket form forks 46 for the support and guidance therebetween of angularly outstanding tension wheels 47 journalled in connection with the forks 46 on pins 48.

The tension wheels 47 are thus adapted to project into engagement with the internal surface of a drill pipe upon relative opposite sides of a point diametrically opposite that point engaged by the longitudinally alined traction gears or wheels 32 whereby to hold the latter in firm uniform contact with the pipe surface.

We have shown the lower end member 12 as provided with an endwise projecting buffer spring 49 anchored at one end thereto, whose function is to relieve the device of any shock of contact with the bit at the lower end of the drill pipe in any case where it is released to descend in the drill pipe of its own volition and travels down through the drilling fluid to be finally arrested at the end of its movement by the drill bit.

We have also shown the upper end member 11 with an upper end in the form of a box 50 having an internal undercut peripheral rim or flange 51 suitable for engagement by a spear in the lowering of the device on a line as well as for fishing for the same in case of accidental release, thereof, in the drill pipe. It will be understood that this formation of the upper end member 11 may be varied at will and other suitable line connecting means substituted as well conditions indicate. Obviously many other changes in details of the device or apparatus above described may be made for the same reasons or as dictated by economy in the manufacturing processes.

It is plain the device of the present invention is only released for movement of its own volition downwardly in a drill pipe when measurement of the pipe is desired to be accurately determined just prior to withdrawal of the pipe from the well as for instance for the replacement of the bit. In such instances the pipe is withdrawn and the measuring device recovered from that section of the drill pipe to which the bit is attached.

In other instances of use, the device is lowered on a line and immediately withdrawn by such line after it has traversed the length of the drill pipe, and in all instances, whether line supported or free, it moves of its own weight downwardly through the drilling fluid or mud with its register actuating members in uniformly tensioned engagement with the drill pipe at points spaced longitudinally of the pipe so as to insure against all danger of inaccuracy.

It will be understood, of course, that the gearing between the traction wheels and the registering mechanism will be such that each complete rotation of the former in contact with the pipe will register a definite predetermined advance of the latter. It is also to be understood that the registering mechanism is of a known type whose mechanism will be advanced by rotation of its actuating shaft, or in other words by rotation of the gear wheel 20 in either direction so that if the device is lowered on a line and withdrawn by such line the registering mechanism will be similarly advanced on the up-trip as it is on the down-trip. It is then necessary to halve the total to arrive at the exact measurement.

The device of this invention may be used with efficient results, in a convenient easy manner and practically without loss of time and thus presents a highly desirable means of accurately measuring drill pipe while under tension in a well.

We have already referred to the fact that the gearing ratio is such that the register is advanced a predetermined degree for each complete rotation of the traction wheels 32. Preferably the device is so geared that each registering advance of the counting mechanism represents a one foot advance of the traction wheels along the pipe being measured.

Having thus fully described the invention, what is claimed is:

1. A measuring device comprising a member movable lengthwise of a well pipe under tension in a well, and in contact therewith within drilling fluid, and means for registering such movement in lineal feet, said member having a fluid tight pressure chamber in which said registering means is disposed and operates, and also having means whereby the registering means may be read without disturbing the pressure chamber.

2. A measuring device comprising a member movable lengthwise of a well pipe under tension in a well and in relatively opposite directions while in contact therewith, and means for continuously registering such movement of the member in both directions.

3. A measuring device comprising a member adapted to be lowered along, and raised with respect to, a pipe in substantially upright position, said member including a counting device, and means operatively engageable with the pipe and similarly actuating the said counting device continuously during both upward and downward movements of the member with respect to the pipe.

4. A device for measuring pipe under tension in a well, comprising a member equipped to move downwardly through drilling fluid along, and in uniform contact with, said pipe, and having a fluid tight pressure chamber, means carried by said member to register its depth within the well as it moves therein along the pipe including an indicator in said chamber, a wall of said chamber having a sight opening opposite the indicator, and means extending from the indicator to the exterior of the member for resetting the indicator, whereby the indicator may be read and reset without disturbing the pressure chamber.

5. A measuring device comprising a member, for lowering movement in a well pipe under tension in a well and within drilling fluid in said pipe, having a fluid tight pressure chamber, a registering mechanism within said chamber for registering the depth of said member in the well pipe, and means whereby the registered depth may be read from the exterior of the member upon withdarwal from the pipe and without opening said pressure chamber.

6. A measuring device comprising a member, for lowering movement in a well pipe under tension in a well and within drilling fluid in said pipe, having a fluid tight pressure chamber, and a registering mechanism including a counter within said chamber for registering the movement of said member within the pipe, one wall of said chamber having a sight opening opposite to the counter whereby the latter may be read from the exterior of the member without opening said pressure chamber.

7. A measuring device comprising a member, for lowering movement in a well pipe under tension in a well and within drilling fluid in said pipe, having a fluid tight pressure chamber, a registering mechanism within said chamber for registering the depth of said member in the well pipe, and means extending to the exterior of said member for resetting the registering mechanism without entering the pressure chamber.

8. A measuring device comprising a member, for lowering movement in a well pipe under tension in a well and within drilling fluid in said pipe, having a fluid tight pressure chamber for containing a lubricating fluid, a wall of said chamber having an opening, a transparent covering sealing said opening, and a depth registering mechanism carried by said member including a counter disposed within said chamber and having its indicating face disposed closely along the inner surface of said transparent covering to permit of full view of the indicating face through the transparent covering.

9. A measuring device comprising a member adapted for lowering movement in the drilling fluid within a drill pipe under tension in a well, said member having a chamber therein and openings in the wall of said chamber, a transparent covering sealing one of said openings, a closure plate sealing the other opening to thus permit the chamber to hold therein a lubricating fluid, and a depth registering mechanism including a driven shaft having a gear thereon within the chamber and a counter within the chamber having an actuating gear and an indicator face, said counter being mounted on the closure plate and held thereby with the indicator face adjacent the transparent covering to show therethrough, and with the actuating gear in meshed relation with the driven shaft gear.

THOMAS T. NUDSON.
WALTER A. ABEGG.